(12) United States Patent
Branca et al.

(10) Patent No.: US 8,230,401 B2
(45) Date of Patent: Jul. 24, 2012

(54) PERFORMING REGRESSION TESTS BASED ON TEST CASE EFFECTIVENESS

(75) Inventors: Salvatore Branca, Rome (IT); Giorgio Corsetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 11/956,003

(22) Filed: Dec. 13, 2007

(65) Prior Publication Data

US 2008/0215921 A1  Sep. 4, 2008

(30) Foreign Application Priority Data

Dec. 21, 2006 (EP) .................................... 06126767

(51) Int. Cl.
*G06F 9/44* (2006.01)
(52) U.S. Cl. ........................................................ 717/135
(58) Field of Classification Search ........... 717/124–135
See application file for complete search history.

(56) References Cited

U.S. PATENT DOCUMENTS

| 5,634,098 | A | 5/1997 | Janniro et al. |
| 7,178,063 | B1 * | 2/2007 | Smith .......................... 714/38.1 |
| 2002/0053045 | A1 | 5/2002 | Gillenwater et al. |
| 2004/0154001 | A1 | 8/2004 | Haghighat et al. |

FOREIGN PATENT DOCUMENTS

WO   WO 2005/045673 A2   5/2005

OTHER PUBLICATIONS

Orso et al., "Scaling Regression Testing to Large Software Systems", 2004, ACM, pp. 241-251.*
Elbaum et al., "Selecting a Cost-Effective Test Case Prioritization Technique", 4- 2004, CiteSeerX, pp. 1-26.*
Graves, Todd L. et al., "An Empirical Study of Regression Test Selection Techniques", Proceedings of the 1998 International Conference on Software Engineering, Kyoto, Japan, 1998, pp. 188-197.
Rothermel, Gregg et al., "Test Case Prioritization: An Empirical Study", Proceedings of the IEEE International Conference on Software Maintenance, (ICSM '99), Oxford, UK, 1999, pp. 179-188.
International Search Report and Written Opinion dated Oct. 10, 2008 for International Application No. PCT/EP2007/059579, 11 pages.
Rosenblum, David S. et al., "Using Coverage Information to Predict the Cost-Effectiveness of Regression Testing Strategies", IEEE Trans. on Software Engineering, vol. 23, No. 3, Mar. 1997, pp. 146-156.

* cited by examiner

*Primary Examiner* — Ted T Vo

(74) *Attorney, Agent, or Firm* — Stephen J. Walder, Jr.; Jeffrey S. LaBaw

(57) ABSTRACT

A method for performing a regression test on a software application is proposed. The regression test involves the execution of a subset of selected test cases on the software application (among all the ones being available). In the proposed solution, the selection of the test cases to be regressed is performed according to an effectiveness-based criterion. For this purpose, an effectiveness index of each test case is calculated according to its results being obtained during previous executions of the test case; preferably, the effectiveness index is based on the frequency of negative results of the test case (and secondarily on their variability and recency). The test cases whose effectiveness indexes reach a predefined threshold are then selected for running the regression test (on the assumption that they should be more effective in detecting errors of the software application).

16 Claims, 5 Drawing Sheets

PERFORMING REGRESSION TESTS BASED ON TEST CASE EFFECTIVENESS

FIELD OF THE INVENTION

The present invention relates to the test field. More specifically, the present invention relates to regression tests.

BACKGROUND ART

Tests are commonly used to verify whether generic systems (and especially software applications) behave as expected. In this context, many approaches are available to test the software applications.

For example, a complete test is run when a new software application (or the first version of a new level thereof involving major changes) is released. In this case, the test must have a very high coverage, so as to ensure that most features of the software application are validated (for their correctness, completeness and quality). For this purpose, a suite of test cases is executed; each test case involves the application of a predefined input to the software application, which returns a corresponding output in response thereto; a result of the test case is determined by comparing the actual output provided by the software application with an expected response thereof.

On the other hand, a regression test may be used for a new version, release or service level of the software application—typically involving minor changes to a part thereof only. The regression test is aimed at ensuring that the unchanged parts of the software application still work correctly—i.e., that none of the corresponding test cases already executed "regressed" from a positive result (when the test case passed) to a negative result (when the test case failed).

The regression test allows verifying that the changes applied to the software application have not inadvertently introduced any errors into the other parts thereof. For example, this may occur because some preexisting features of the software application do not work properly with the added features; another problem may be due to undiscovered errors (in the preexisting features) that are brought to light by the added features.

However, the regression test is a very time consuming activity. Particularly, in large software applications each run of the regression test typically involves the execution of thousands of test cases (which may require several working days to complete). This drawback is magnified in very dynamic environments, wherein the same operations must be repeated at any change of the software application.

In order to solve the problem, selective strategies are commonly used. The selective strategies (contrary to the so-called retest-all strategy) attempt to reduce the number of test cases to be executed by skipping the ones that are unlikely to be affected by the applied changes. As a consequence, it is possible to avoid executing test cases unnecessarily. This allows maintaining the cost of the regression test at a reasonable level.

Several criteria have been proposed for selecting the test cases to be regressed (among all the ones being available). For example, coverage-based criteria discard the test cases exercising components of the software application that are independent of the applied changes.

However, this requires a thoughtful knowledge of the relationship between the test cases and the components of the software application; at the same time, it is necessary to know the impact of the applied changes (both on the components being directly impacted and on the ones correlated thereto). Therefore, the selection of the test cases involves a deep investigation activity, which must be performed substantially in a manual way by one or more testers. The problem is further exacerbated when the complete test and the regression test are entrusted to different teams, so that the persons in charge of the regression test are unaware of how the complete test was defined.

Therefore, the design of the regression test requires a heavy human intervention. As a consequence, the obtained results are not repeatable and prone to errors (being strongly dependent on the skill of the testers).

A solution for automating the selection of the test cases to be regressed is disclosed in US-A-2004/0154001. This document proposes the definition of a profile that allows identifying the test cases that are likely to invoke one or more modules of the software application being impacted by the applied changes. However, this requires instrumenting the software application with extra code intended to collect statistics that are then recorded in the profile.

SUMMARY OF THE INVENTION

In its general terms, the present invention is based on the idea of selecting the test cases according to their effectiveness. Particularly, the present invention provides a solution as set out in the independent claims. Advantageous embodiments of the invention are described in the dependent claims.

More specifically, in one illustrative embodiment, an aspect of the invention provides a method for performing a regression test of a system. The regression test is performed following a plurality of previous runs of a test on the system. Each previous run of the test includes the execution of at least part of a plurality of test cases, each one providing a corresponding previous result. The method starts with the step of selecting a subset of the test cases. The selected test cases are then executed on the system. The above-mentioned step of selecting the subset of the test cases is performed according to the previous results of the test cases.

A different aspect of the invention proposes a computer program for performing the above-described method. Another aspect of the invention proposes a corresponding system. Yet another aspect of the invention provides an apparatus comprising a processor and a memory coupled to the processor, the memory having instructions, which when executed by the processor, cause the processor to implement the method described above.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
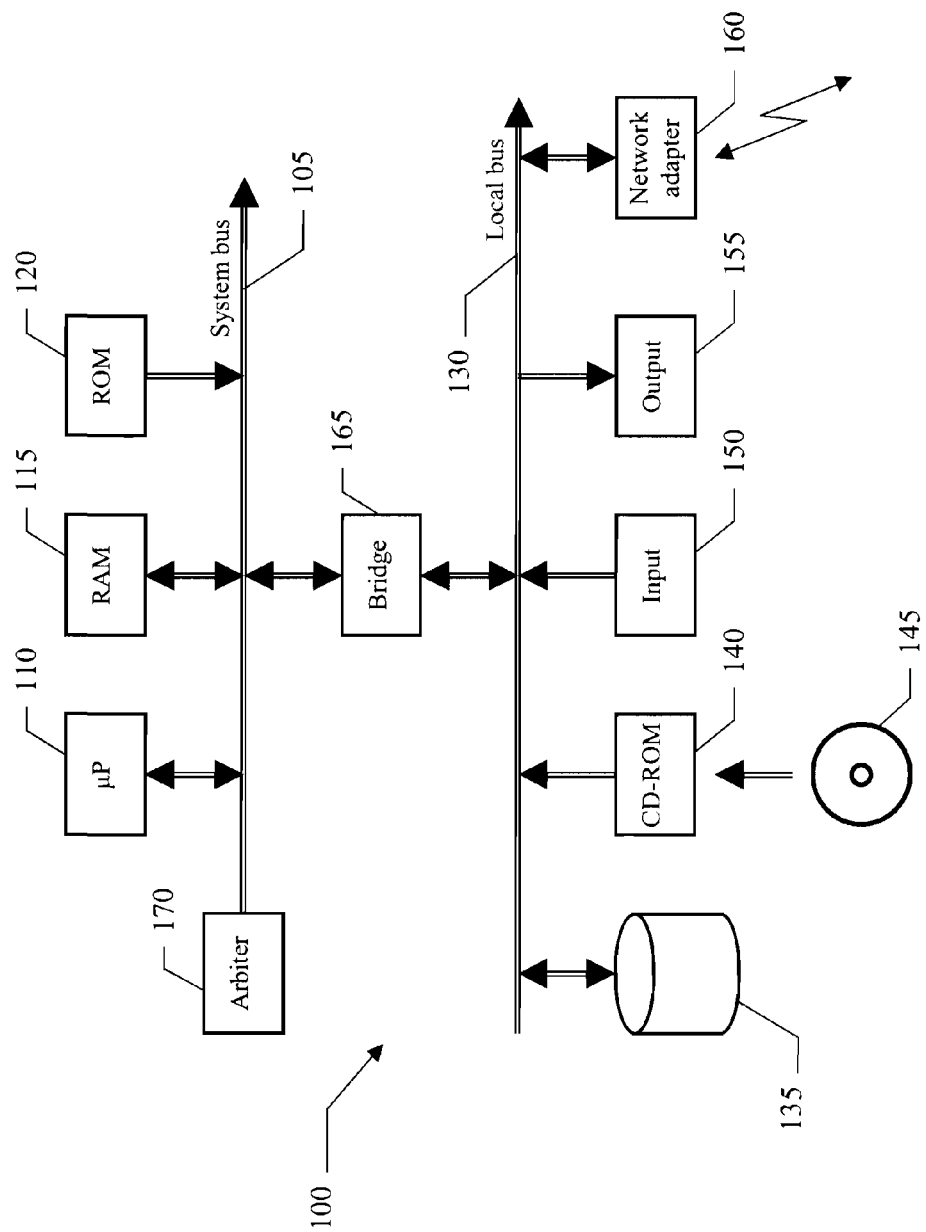
FIG. 1 is a schematic block diagram of a data processing system in which the solution according to an embodiment of the invention is applicable.

With reference in particular to FIG. 1, a computer 100 (for example, consisting of a workstation) is illustrated. The computer 100 is formed by several units that are connected in parallel to a system bus 105. In detail, one or more microprocessors (μP) 110 control operation of the computer 100; a RAM 115 is directly used as a working memory by the microprocessor(s) 110, and a ROM 120 stores basic code for a bootstrap of the computer 100. Several peripheral units are clustered around a local bus 130 (by means of respective interfaces). Particularly, a mass memory consists of a hard-disk 135 and a drive 140 for reading CD-ROMs 145. Moreover, the computer 100 includes input units 150 (for example, a keyboard and a mouse), and output units 155 (for example, a monitor and a printer). An adapter 160 is used to connect the computer 100 to a network (not shown in the figure). A bridge unit 165 interfaces the system bus 105 with the local bus 130. Each microprocessor 110 and the bridge unit 165 can operate as master agents requesting an access to the system bus 105 for transmitting information. An arbiter 170 manages the granting of the access with mutual exclusion to the system bus 105.

Figure 2A:
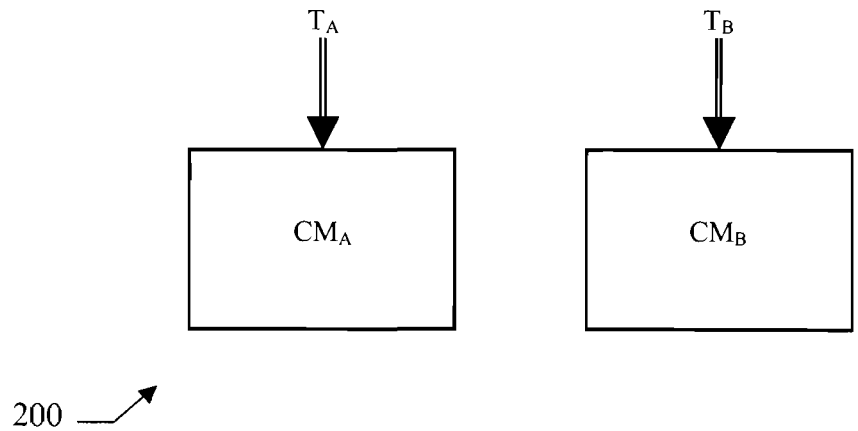
FIGS. 2a-2b illustrate an exemplary application of the solution according to an embodiment of the invention.

Considering now FIG. 2a, the above-described computer is used to test a software application 200. The software application 200 is generally formed by distinct components (such as independent modules); in the example at issue, for the sake of simplicity, only two components $CM_A$ and $CM_B$ are illustrated. A set of test cases $T_A$ and a set of test cases $T_B$ are available to test the component $CM_A$ and the component $CM_B$, respectively. The execution of each test case involves the application of a predefined input to the corresponding component $CM_A$, $CM_B$; for example, the input may consist of data and/or commands with possible arguments. The component $CM_A$, $CM_B$ returns a corresponding output in response to this input (for example, data, messages and/or error codes). A result of the test case is determined by comparing the (actual) output of the component $CM_A$, $CM_B$ with an expected response thereof; the expected response is the one that is deemed correct according to the desired behavior of the component $CM_A$, $CM_B$. The result of the test case is set to positive (i.e., passed) when the output matches the expected response—to indicate a correct operation of the component $CM_A$, $CM_B$; otherwise, when the output differs from the expected response, the result of the test case is set to negative (i.e., failed)—to indicate an error of the component $CM_A$, $CM_B$.

Figure 2B:
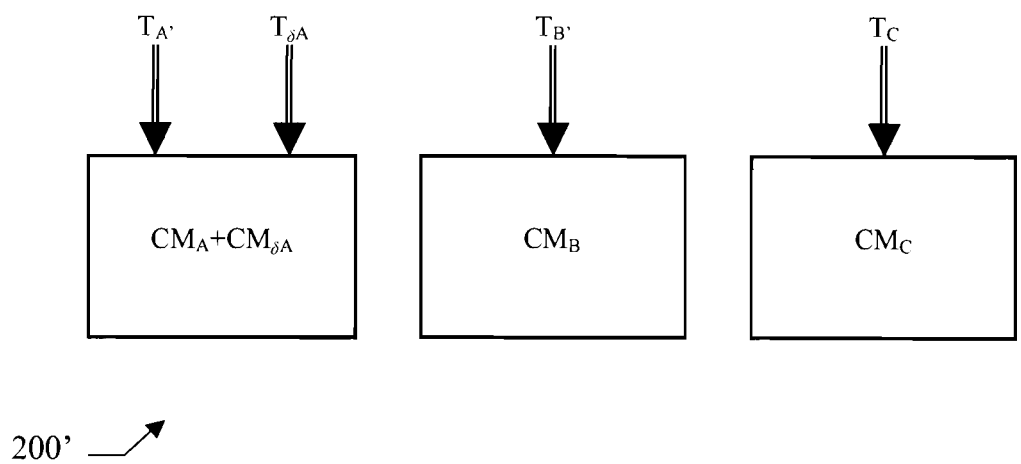

Later on, as shown in FIG. 2b, the above-described software application is updated. The updated software application so obtained is denoted with 200'; for example, a new feature $CM_{\delta A}$ is inserted into the component $CM_A$ (i.e., $CM_A + CM_{\delta A}$), the component $CM_B$ is unchanged, and a new component $CM_C$ is developed. The test of the feature $CM_{\delta A}$ and of the component $CM_C$ (being added) requires the definition of a new set of test cases $T_{\delta A}$ and a new set of test cases $T_C$, respectively. At the same time, a regression test must be run on the component $CM_A$ and the component $CM_B$ (being unchanged). For this purpose, a subset $T_{A'}$ of the test cases $T_A$ is selected for the component $CM_A$, and a subset $T_{B'}$ of the test cases $T_B$ is selected for the component $CM_B$.

In the solution according to an embodiment of the present invention, as described in detail in the following, the selection of the test cases to be regressed is performed according to an effectiveness-based criterion. For this purpose, the effectiveness of each test case (to discover errors in the corresponding component) is estimated according to its previous results, which were obtained during previous executions of the same test case.

In a specific implementation, the main criterion for the selection of the test cases depends on a frequency of their negative previous results; particularly, the test cases with a high frequency of negative previous results are preferred. For example, let us consider two test cases $t_1$ and $t_2$ for the same component; the previous executions of the test cases $t_1$ and $t_2$ provided the following results (wherein P stands for positive and N stands for negative):

| $t_1$: | N | N | N | P | N | N | N | N | N | N | P, |
|---|---|---|---|---|---|---|---|---|---|---|---|
| $t_2$: | N | N | P | P | P | P | P | P | P | P | P. |

In this case, it is preferable to select the test case $t_1$ (instead of the test case $t_2$); indeed, the test case $t_1$ has a higher number of negative previous results than the test case $t_2$ has (i.e., 9>2).

This choice is based on the assumption that the test cases providing many negative results are more effective in detecting errors of the software application. Indeed, the test cases with a high number of negative results probably exercise a part of the software application that is very dependent on changes being applied to the other parts thereof; on the contrary, the test cases with a low number of negative results should exercise a well-defined part of the software application (which correct operation is not affected by the changes applied to the other parts thereof). Moreover, whenever a test case discovers an error of the software application (and then provides a negative result), its execution is generally aborted. In this case, the remaining portion of the software application intended to be verified by the test case is not exercised; therefore, this part of the software application (being not tested yet, or at least not tested thoroughly) may include further errors that are still undiscovered.

The proposed solution allows selecting the test cases to be regressed automatically. This advantage is clearly perceived in large software applications, and especially in very dynamic environments (although any other application of the same solution is contemplated).

Particularly, the desired result is achieved without requiring any knowledge of the available test cases; therefore, the devised technique is of general applicability (even when the test is entrusted to different teams over time).

As a consequence, the human intervention in the design of the regression test is substantially removed (or at least reduced); this has a beneficial impact on its reliability and repeatability.

Moreover, the application of the proposed solution is completely opaque to the software application under test (since it does not require any change thereto).

As a further enhancement, the selection of the test cases to be regressed is further based (as a secondary criterion) on a time pattern of the previous results of each test case.

Particularly, in a proposed implementation the selection of the test cases also depends on the variability of their (positive/negative) previous results; particularly, the test cases with a high frequency of changes in the previous results (from positive to negative or vice-versa at each pair of consecutive executions thereof) are preferred. For example, let us consider two further test cases (for the same component) $t_5$ and $t_6$, which provided the following results during their previous executions:

| $t_3$: | P | N | P | N | P | N | P | N | P | N | P, |
|---|---|---|---|---|---|---|---|---|---|---|---|
| $t_4$: | N | N | N | N | N | P | P | P | P | P | P. |

The two test cases $t_3$ and $t_4$ have the same number of negative previous results (i.e., 5). However, it is better to select the test case $t_3$ (instead of the test case $t_4$); indeed, the previous results of the test case $t_3$ exhibit a higher number of changes than the ones of the test case $t_4$ do (i.e., 10>1).

This ensues from the observation that continual changes in the results of a test case are indicative of an unstable condition of the corresponding part of the software application that is exercised. Conversely, when the same (positive) results of a test case are repeated, it is very likely that any error has been fixed in a definite way.

In addition or in alternative, the test cases having very recent negative previous results are preferred. For example, let us consider two further test cases $t_5$ and $t_6$ providing the following previous results:

| | | | | | | | | | | |
|---|---|---|---|---|---|---|---|---|---|---|
| $t_5$: | P | N | P | N | P | P | P | P | P | P | P, |
| $t_6$: | P | P | P | P | P | P | P | N | P | N | P. |

The two test cases $t_5$ and $t_6$ have the same number of negative previous results (i.e., 2) and the same number of changes (i.e., 4). However, it is now preferable to select the test case $t_6$ (instead of the test case $t_5$); indeed, the last negative previous result of the test case $t_6$ is more recent than the one of the test case $t_5$ (since they were obtained 2 executions ago and 8 executions ago, respectively).

This is due to the assumption that when a test case discovered an error recently, it may happen that this error has not been completely fixed yet; anyway, it is advisable to verify the correct operation of the software application in this respect (especially just after the alleged fix of the error). Conversely, a test case that has not discovered any error in a long period should exercise a part of the software application that is actually correct (and independent of the other parts of the software application).

Figure 3:
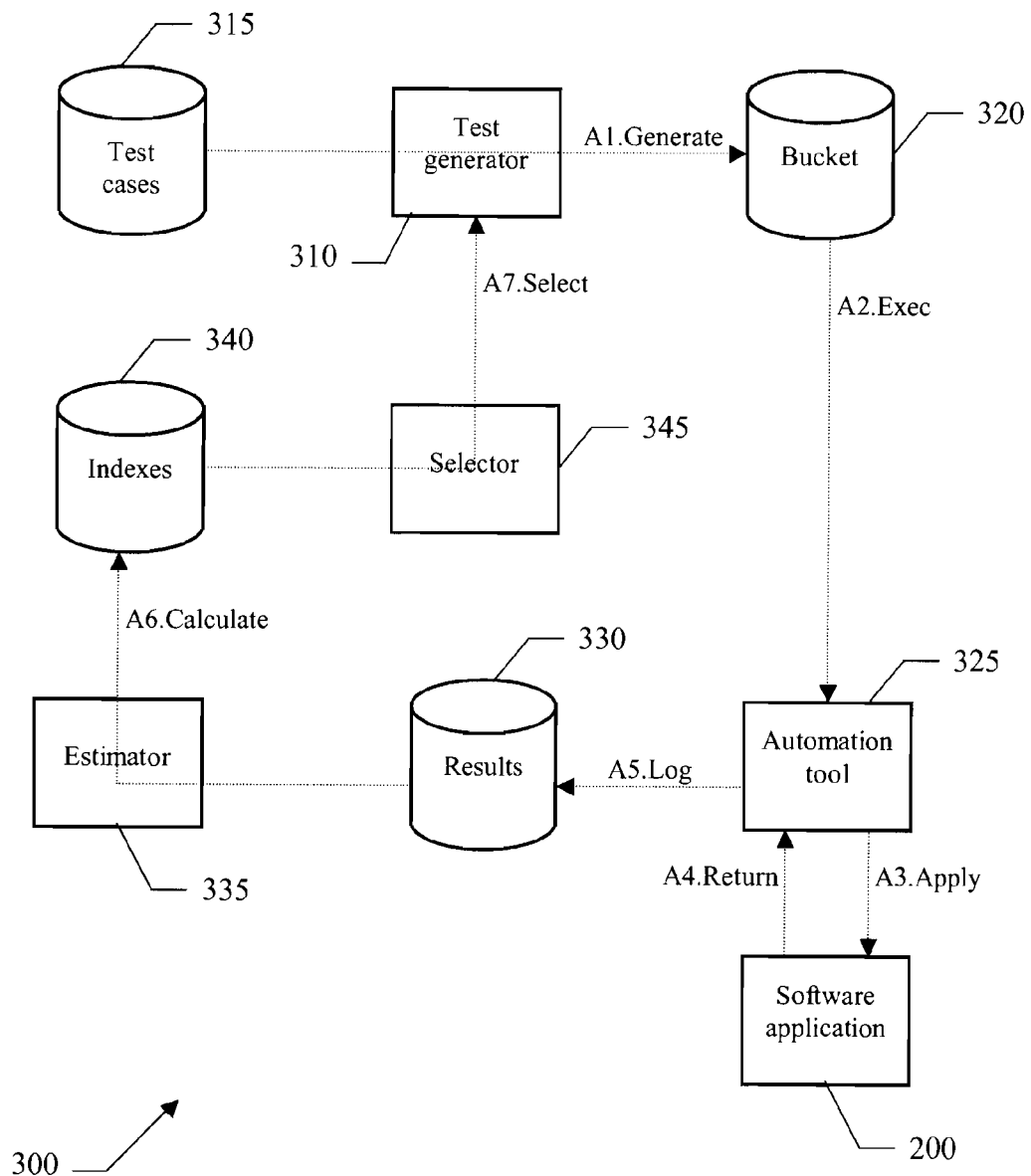
FIG. 3 is a collaboration diagram representing the roles of different software modules that may be used to implement the solution according to an embodiment of the invention.

With reference now FIG. 3, the main software modules that run on the above-described computer are denoted as a whole with the reference 300. The information (programs and data) is typically stored on the hard-disk and loaded (at least partially) into the working memory of the computer when the programs are running. The programs are initially installed onto the hard-disk, for example, from CD-ROMs. Particularly, the figure describes the static structure of the system (by means of the corresponding modules) and its dynamic behavior (by means of a series of exchanged messages, each one representing a corresponding action, denoted with sequence numbers preceded by the symbol "A").

Particularly, the figure illustrates an infrastructure that is used to test the above-described software application 200. More in detail, the infrastructure includes a test generator 310. The test generator 310 accesses a repository 315, which stores a suite of test cases available to verify the correctness of the whole software application 200; each test case specifies an input to be applied to the software application 200 and the expected response that should be returned in response to this input (to indicate its correct operation). Typically, the test cases are organized into sets, each one for a different component of the software application 200.

The test generator 310 creates an execution bucket for each run of the test on the software application 200. The bucket specifies the operations to be performed for running the desired test cases in a machine-readable language (such as XML-based). Particularly, in the case of a complete test all the available test cases are executed on each component of the software application 200; conversely, in the case of a regression test the execution is limited to a subset of selected test cases. The bucket so obtained is saved into a file 320 (action "A1.Generate").

An automation tool 325 (for example, consisting of the STAF/STAX—formed by the STAX execution engine running on top of the STAF framework) controls the execution of the bucket read from the file 320 (action "A2.Exec"). For each test case of the bucket, this involves the application of the corresponding input to the software application 200 (action "A3.Apply"). In response thereto, the software application 200 returns a corresponding output to the automation tool 325 (action "A4.Return"). The automation tool 325 determines the result of the test case by comparing its output with the corresponding expected response (extracted from the file 320). The result of the test case (i.e., positive when the two values match and negative otherwise) is saved into a log 330 (action "A5.Log"). For example, this may be achieved by means of a standard Test Tracking Tool (TTT), such as the "Rational Test Manager" by IBM Corporation. The results of the (current) run of the test are available in the log 300 for their analysis as usual.

In the solution according to an embodiment of the invention, the log 330 also stores historic information relating to previous runs of the test. Particularly, for each component of the software application 200 the log 330 stores a counter indicating how many times the regression test has been run on the component (after its complete test). For each test case that was selected during the last run of the test on the corresponding component of the software application 200, the log 330 includes a sequence of the previous results (positive or negative), which were obtained during its last previous executions. The other test cases (which were not selected during the last run of the test on the corresponding component of the software application 200) are instead invalidated in the log 330 (so as to be automatically discarded in the next runs of the test); for example, this may be achieved by setting an invalidation flag, which is reset whenever the test case is involved in a complete test (requiring its unconditioned execution).

An estimator 335 accesses the log 330. At each new run of the test on the software application 200, the estimator 335 calculates an effectiveness index for each relevant test case (i.e., being not invalidated); for example, the effectiveness index ranges from 0—when the test case is substantially unnecessary—to 1—when the test case is very likely to discover errors. As described in detail in the following, the effectiveness index is calculated from the previous results of the test case (such as according to the frequency of its negative previous results). The effectiveness indexes of all the (relevant) test cases are saved into a table 340 (action "A6.Calculate").

A selector 345 chooses a subset of the test cases (available for each component of the software application 200) according to their effectiveness indexes (extracted from the table 340). For example, this is achieved by discarding the test cases whose effectiveness indexes do not reach a predefined threshold—from 0 (when all the test cases must be executed) to 1 (when no test case must be executed). The selector 345 provides a list of the selected test cases to the test generator 310. This information is used to select the desired test cases in the repository 315 during the new run of the test (as described above).

Figure 4A:
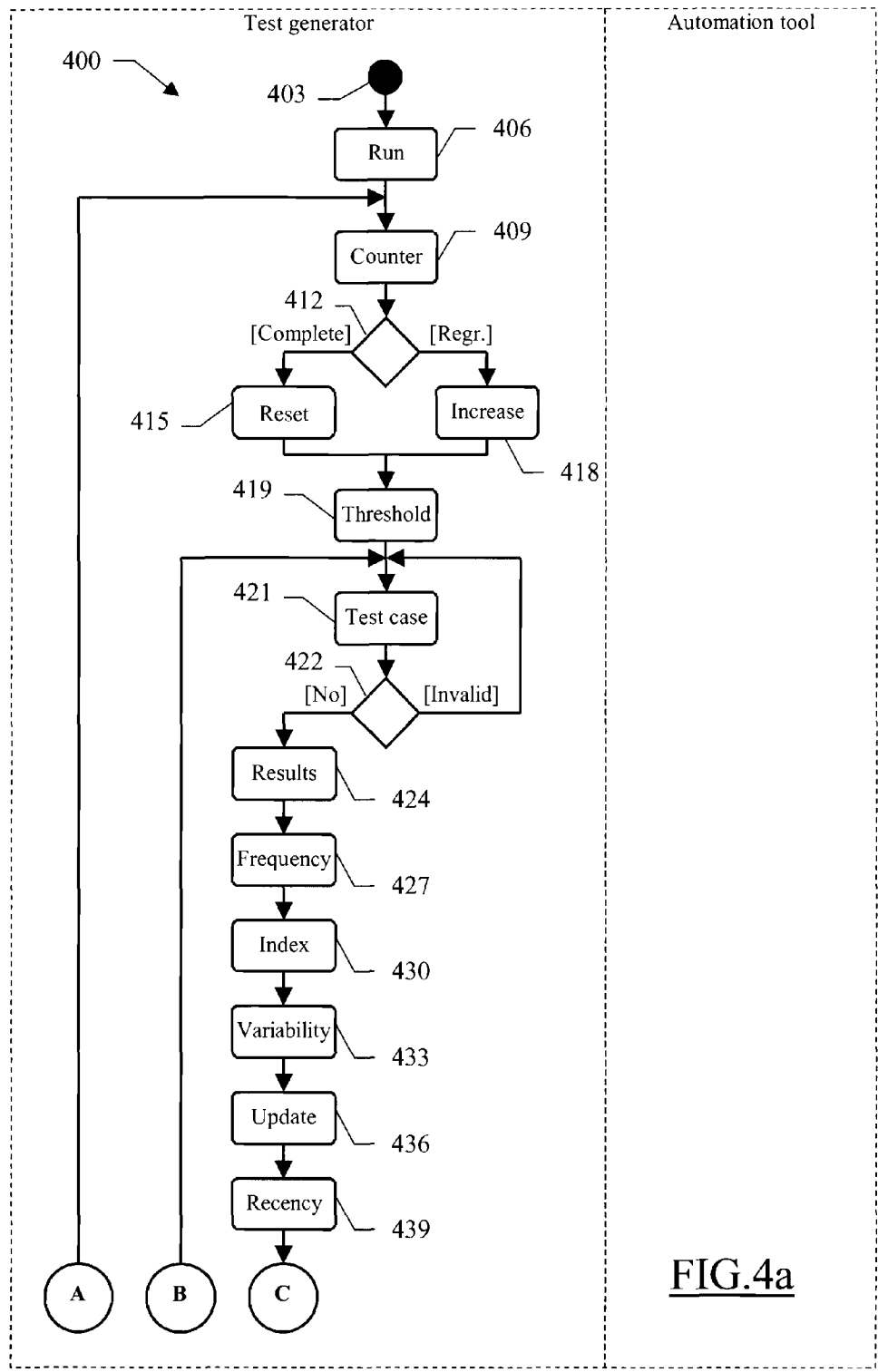
FIGS. 4a-4b show a diagram describing the flow of activities relating to an implementation of the solution according to an embodiment of the invention.
Figure 4B:
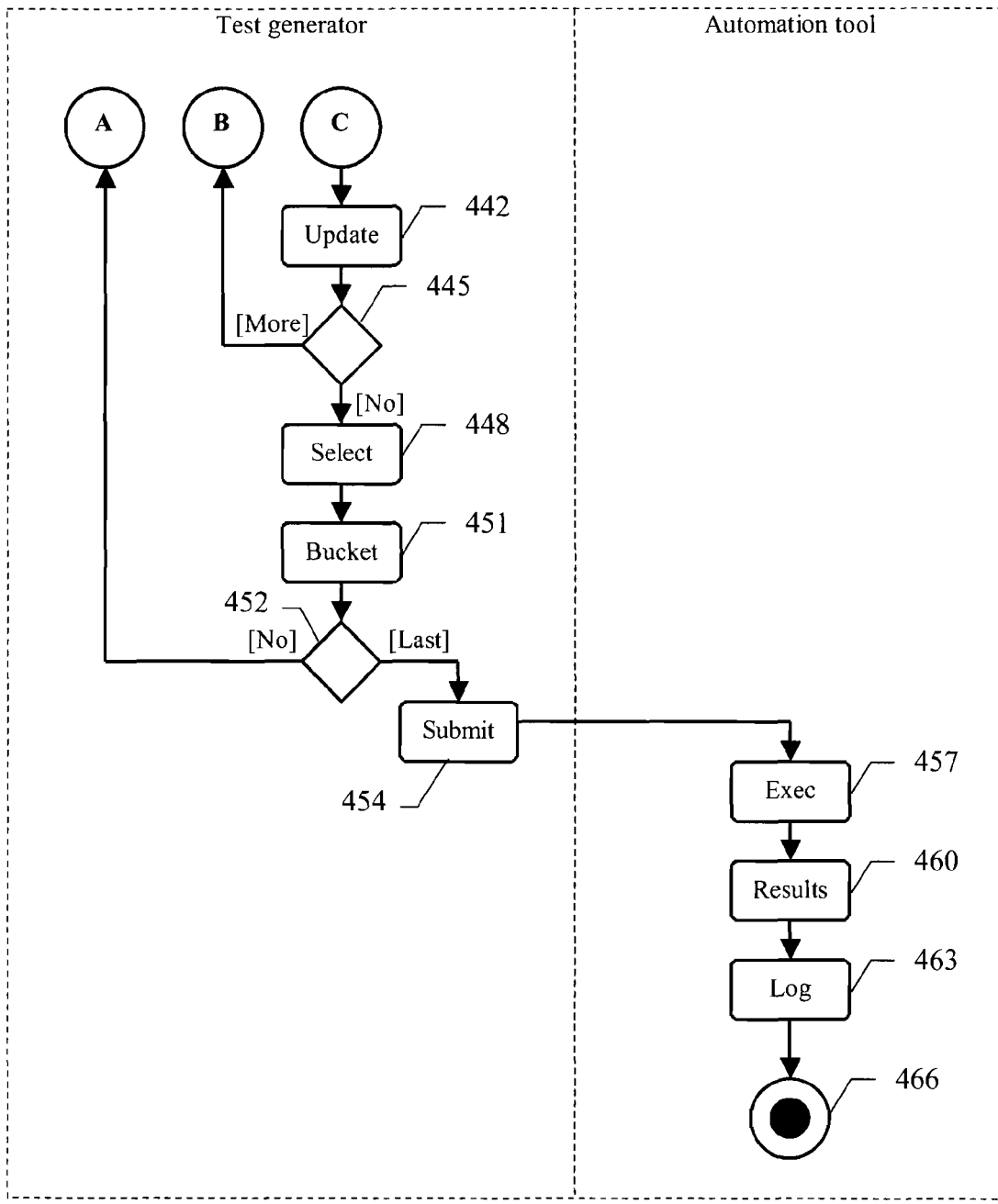

Moving now to FIGS. 4a-4b, the logic flow of an exemplary process that can be implemented to test a generic software application is represented with a method 400. The method begins at the start block 403 in the swim-lane of the test generator, and then passes to block 406 when a new test must be run on the software application.

A loop is performed for each component of the software application (starting from the first one). The loop begins at block 409, wherein the corresponding counter is retrieved from the log; as pointed out above, this counter (denoted with CN) indicates how many times the regression test has been run on the component after its complete test (starting from 0). The method then branches at block 412 according to the type of test to be run on the component. If a complete test is required (for example, when the component is released for the first time or after the application of major changes—such as at a new version of the software application), the counter CN is reset to 0 at block 415. Conversely, when a regression test is required (for example, at a new release or service level of the software application that do not involve any change to the component), the counter CN is increased by 1 at block 418.

In both cases, the flow of activities joints at block 419. In this phase, the threshold to be used for selecting the test cases to be executed on the component (denoted with $\epsilon$) is calculated from the counter CN by applying the following formula:

$$\varepsilon = \sum_{i=1...CN} \frac{1}{2 \propto i}.$$

In this way, at the run of the complete test (CN=0) the threshold $\epsilon$ will be equal to 0 (so that all the test cases will always be selected). Instead, at the first run of the regression test (CN=1) the threshold $\epsilon$ will be equal to 0.5; the threshold $\epsilon$ will thus be equal to 0.75 at the second run of the regression test (CN=2), to 0.875 at the third run of the regression test (CN=3), and so on. As can be seen, the threshold $\epsilon$ increases at each run of the regression test (with respect to its value at the preceding run thereof); this involves a reduction of the test cases that will be selected for execution (since their effectiveness index must exceed the threshold $\epsilon$). This additional feature allows modulating the regression test dynamically; particularly, the number of test being executed lowers as the component becomes more and more mature (so that it is likely to have no errors).

An inner loop is then started at block 421 for each test case that is available to verify the component (in the corresponding repository). Continuing to block 422, the method verifies whether the test case has been invalidated (as indicated by the corresponding flag stored in the log). If so (meaning that the test case was not selected during the last run of the test), the flow of activity returns to block 421 directly; in this way, the test case is skipped (by passing to process a next test case), so as to exclude it from the selection process. Conversely (i.e., when the test case was not invalidated), the process descends to block 424; in this phase, the previous results of the test case are extracted from the log. Typically, the log stores the results of the last N previous executions of the test case (with N=10-100), being denoted with $R = \{r_1 \ldots r_N\}$; for example, each previous result is equal to 0 when positive (passed) or it is equal to 1 when negative (failed).

Proceeding to block 427, the frequency of the negative previous results of the test case (denoted with $F_n$) is calculated:

$$F_n = \frac{\sum_{i=1...N} r_i}{N}.$$

A first estimate of the effectiveness index of the test case (denoted with $\eta$) is set to the frequency $F_n$ at block 430 (i.e., $\eta = F_n$). In this way, the effectiveness index $\eta$ will range from 0 (when all the previous results are positive, i.e., $r_i=0$) to 1 (when all the previous results are negative, i.e., $r_i=1$), with the higher the number of negative previous results the higher the effectiveness index $\eta$.

With reference now to block 433, a variability gauge is calculated according to a frequency of the changes in the previous results of the test case; for example, the variability gauge (denoted with $G_v$) is set to:

$$G_v = \frac{\sum_{i=2...N} |r_i - r_{i-1}|}{N-1}.$$

Therefore, the variability gauge $G_v$ will range from 0 (when the previous results are uniform, i.e., always negative or always positive) to 1 (when in each pair of consecutive previous results of the test case a change occurs, i.e., from positive to negative or vice-versa), with the higher the number of changes the higher the variability gauge $G_v$. The effectiveness index $\eta$ is then updated at block 436 according to the variability gauge $G_v$. For example, the desired result may be achieved by applying the following formula:

$$\eta = \eta + \frac{(1-\eta)}{2} \cdot (2 \cdot G_v - 1).$$

In this way, the effectiveness index $\eta$ remains unchanged when the variability gauge $G_v$ is equal to 0.5—since $$\eta = \eta + \frac{(1-\eta)}{2} \cdot 0 = \eta;$$

conversely, the effectiveness index $\eta$ increases when the variability gauge $G_v$ is higher than 0.5—up to $$\eta = \eta + \frac{(1-\eta)}{2} \cdot 1 = \eta + \frac{(1-\eta)}{2}$$

when $G_v=1$—and it decreases otherwise—down to $$\eta = \eta + \frac{(1-\eta)}{2} \cdot (-1) = \eta - \frac{(1-\eta)}{2}$$

when $G_v=0$. Particularly, when the effectiveness index $\eta=1$ (previous results all negative), the variability gauge $G_v=0$ (previous results uniform); in this case, the effectiveness index $\eta$ remains unchanged. On the other hand, when the effectiveness index $\eta=0$ (previous results all positive), the variability gauge $G_v=0$ as well (previous results uniform); therefore, the effectiveness index $\eta$ would decrease to −0.5 (in this case, however, it is preferable to leave the effectiveness index $\eta$ again unchanged).

Moving to block 439, a recency gauge is now calculated according to an age of the last negative previous result of the test case; for example, the recency gauge (denoted with $G_p$) is set to:

$$G_p = i',$$

where i' is the index (from 1 to N) of the last negative previous result ($r_{i'}$=1) of the test case, with i'=0 when all the previous results are positive. Therefore, the recency gauge $G_p$ will range from 0 (when no negative previous result exists) to 1 (when the last previous result is negative, i.e., i'=N), with the more recent the last negative previous result the higher the recency gauge $G_p$. The effectiveness index η is then updated at block 442 according to the recency gauge $G_p$. For example, the desired result may be achieved by applying the following formula:

$$\eta = \eta + \frac{(1-\eta)}{2} \cdot (2 \cdot G_p - 1).$$

As above, the effectiveness index η remains unchanged when the recency gauge $G_p$ is equal to 0.5; conversely, the effectiveness index η increases when the recency gauge $G_p$ is higher than 0.5—up to $$\eta = \eta + \frac{(1-\eta)}{2}$$

when $G_p$=1—and it decreases otherwise—down to $$\eta = \eta - \frac{(1-\eta)}{2}$$

when $G_p$=0. Particularly, when the effectiveness index η=1 (previous results all negative), the recency gauge $G_p$=1 (last previous result negative); in this case, the effectiveness index η remains unchanged. On the other hand, when the effectiveness index η=0 (previous results all positive), the recency gauge $G_p$=0 (no negative previous result); therefore, the effectiveness index η would decrease to −0.5 (in this case, however, it is preferable to leave the effectiveness index η again unchanged).

A test is now made at block 445 to determine whether the last test case of the component has been processed. If not, the method returns to block 421 to repeat the same operations on a next test case. Conversely, the flow of activities passes to block 448. In this phase, a subset of the test cases is selected for their regression. Particularly, denoting with T={$t_1 \ldots t_H$} the set of (non-invalidated) test cases being available, the selected subset will be T'={$t_{1'} \ldots t_{H'}$} (with H'<=H), where $t_i \geq \epsilon$ for i=1 ... H'. A sub-bucket for the selected test cases is then generated at block 451.

The method now verifies at block 452 whether all the components of the software application have been processed. If not, the flow of activity returns to block 409 to reiterate the same operations described above on a next component.

On the contrary, a (total) bucket so obtained—for testing all the components of the software application—is submitted to the automation tool at block 454. In response thereto, the automation tool at block 457 controls the execution of each test case of the submitted bucket (by applying the corresponding input to the software application). Continuing to block 460, the automation tool determines the result of each test case (by comparing its output with the corresponding response). The result of the test is logged at block 463. Particularly, for each selected test case the result so obtained is added to the sequence of its previous results (by discarding the oldest one when they exceed the maximum allowable number N); conversely, for each non-selected test case the corresponding invalidation flag is asserted (if necessary). The method then ends at the concentric white/block stop circles 466.

Naturally, in order to satisfy local and specific requirements, a person skilled in the art may apply to the solution described above many modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order no to obscure the description with unnecessary particulars. Moreover, it is expressly intended that specific elements and/or method steps described in connection with any disclosed embodiment of the invention may be incorporated in any other embodiment as a matter of general design choice.

Particularly, similar considerations apply if the proposed solution is implemented with an equivalent method (by using similar steps, removing some steps being not essential, or adding further optional steps—even in a different order).

Anyway, the same technique may also be applied to any equivalent regression test (for example, from run to run of the test, from build to build, from release to release, or from fix-pack to release of the software application), at the level of either each component individually or the software application as a whole. Likewise, the test cases may be executed on Command Line Interfaces (CLIs), on Graphical User Interfaces (GUIs), on distributed applications (such as of the web type), and so on. Each bucket may also be generated in a different language for use by any other automation tool; anyway, nothing prevents running the test in a manual way.

Moreover, it may be advantageous to combine the proposed selection technique (of the effectiveness-based type) with the standard selection techniques of the coverage-based type, in order to minimize the number of test cases to be regressed.

Although in the preceding description great emphasis has been given to the test of software applications, this is not to be interpreted in a limitative manner; more generally, the proposed technique may be used to test operating systems, telecommunication architectures, computers, electronic devices, or any other system. Accordingly, the inputs and outputs may be replaced by equivalent stimuli and responses, respectively (such as interrupts, remote invocations, physical actions, electrical signals, and the like).

Moreover, it is possible to determine the results of the test cases according to any other criteria (for example, by comparing the returned output with a range of expected values). More generally, the frequency of the negative previous results of each test case may be calculated in a different way (for example, by applying statistics techniques based on the reliability of the previous results). More generally, the test cases to be regressed are selected in any other way according to their previous results; for example, in an alternative embodiment, it is possible to select the test cases that provided at least a predefined number of last negative previous results (either consecutively or with at most a maximum allowable number of positive previous results among them).

Any other indicator of the time pattern of the previous results of each test case may be used to update its effectiveness index; for example, it is possible to base this operation on the frequency of the negative previous results in the last runs of the test, on the number of consecutive negative previous results being obtained, and the like. However, this feature is not strictly necessary and it may be omitted in a simplified implementation of the invention.

Alternatively, the variability of the previous results may be defined with different indicators (for example, only based on the changes from a positive previous result to two or more consecutive negative previous results).

Likewise, it is possible to update the effectiveness index according to the age of the last two or more negative previous results.

Naturally, the above described threshold value is merely illustrative; likewise, the effectiveness index may be calculated with any other equivalent algorithm. Moreover, the same results are achieved in a dual configuration (wherein the test cases having different indexes below another threshold value are selected).

The above-described formula for updating the threshold value dynamically is merely illustrative; for example, it is possible to reduce the threshold value with any other law (for example, of the logarithmic type). Anyway, the use of a fixed threshold (for example, being configured statically) is contemplated.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with a hardware structure (for example, integrated in a chip of semiconductor material), or with a combination of software and hardware.

Alternatively, the proposed method may be carried out on a computer having a different architecture or including equivalent units (such as cache memories temporarily storing the programs or parts thereof to reduce the accesses to the mass memory during execution); likewise, the same solution may also be applied to a central server (for testing multiple clients), to a network of computers (for testing a co-operative environment), and the like. More generally, it is possible to replace the computer with any code execution entity (such as a PDA, a mobile phone, and the like), or with a combination thereof (such as a client/server architecture, a grid computing infrastructure, and the like).

The invention claimed is:

1. A method, in at least one computing device, for performing a regression test of a system following a plurality of previous runs of a test on said system, each previous run of the test including the execution of at least part of a plurality of test cases each one providing a corresponding previous result, wherein the method comprises:

selecting a subset of test cases, from the plurality of test cases, based on a sequence of previous results of the test cases; and executing the selected test cases on the system to perform regression testing of the system and generate regression test results indicative of whether or not changes to the system have introduced errors, wherein:

each previous result is positive when indicative of a correct operation of the system or negative when indicative of an error of the system, wherein selecting the subset of test cases comprises selecting a test case, from the plurality of tests cases, to be part of the subset of test cases, and wherein selecting a test case, from the plurality of test cases, to be part of the subset of test cases comprises:

calculating an effectiveness index of the test case based on the previous results of the test case, and selecting the test case to be a part of the subset of the test cases according to a comparison of the effectiveness index of the test case with a threshold value, wherein calculating an effectiveness index of the test case based on the previous results of the test case comprises calculating an initial estimate of the effectiveness index based on a frequency of negative previous results calculated based on the total number of negative previous results, and wherein selecting the subset of the test cases comprises at least one of:

selecting a test case, from the plurality of test cases, to be part of the subset of test cases, in response to a total number of negative previous results generated by previous runs of the test case, as indicated in a sequence of previous results associated with the test case, being larger than one or more other test cases in the plurality of test cases, selecting a test case, from the plurality of test cases, to be part of the subset of test cases, based on a number of changes in results generated by previous runs of the test case in the sequence of previous results associated with the test case, the changes in results being either a change from a negative result to a positive result or a positive result to a negative result; or selecting a test case, from the plurality of test cases, to be part of the subset of test cases, in response to the test case having a more recent negative previous result when compared to one or more other test cases in the plurality of test cases.

2. The method according to claim 1, wherein the system is a software application.

3. The method according to claim 1, wherein selecting the subset of the test cases further comprises:

updating the threshold value at each run of the regression test to reduce a number of the selected test cases with respect to a previous run of the regression test.

4. The method of claim 1, wherein calculating an effectiveness index of the test case based on the previous results of the test case comprises:

updating the initial estimate of the effectiveness index based on a variability gauge value calculated based on the number of changes in results generated by previous runs of the test case in the sequence of previous results associated with the test case, to thereby generate the effectiveness index.

5. The method of claim 4, wherein the effectiveness index is calculated using the formula:

$$\eta = \eta + ((1-\eta)/2) * (2*G_v - 1)$$

where $\eta$ is the effectiveness index and $G_v$ is the variability gauge value.

6. The method of claim 4, wherein calculating an effectiveness index of the test case based on the previous results of the test case comprises:
 updating the effectiveness index based on a recency value calculated based on a most recent run of the test case that resulted in a negative previous result.

7. The method of claim 6, wherein the effectiveness index is updated based on the recency value using the formula:

$$\eta = \eta + ((1-\eta)/2)*(2*G_p - 1)$$

where $G_p$ is the recency value.

8. A computer program product comprising a non-transitory computer storage medium having a computer readable program, wherein the computer readable program, when executed on a computing device, causes the computing device to perform a regression test of a system following a plurality of previous runs of a test on said system, each previous run of the test including the execution of at least part of a plurality of test cases each one providing a corresponding previous result, wherein the regression test of the system comprises:
 selecting a subset of test cases, from the plurality of test cases, based on a sequence of previous results of the test cases; and
 executing the selected test cases on the system to perform regression testing of the system and generate regression test results indicative of whether or not changes to the system have introduced errors, wherein:
 each previous result is positive when indicative of a correct operation of the system or negative when indicative of an error of the system, wherein selecting the subset of test cases comprises selecting a test case, from the plurality of tests cases, to be part of the subset of test cases, and wherein selecting a test case, from the plurality of test cases, to be part of the subset of test cases comprises:
  calculating an effectiveness index of the test case based on the previous results of the test case, and
  selecting the test case to be a part of the subset of the test cases according to a comparison of the effectiveness index of the test case with a threshold value, wherein calculating an effectiveness index of the test case based on the previous results of the test case comprises calculating an initial estimate of the effectiveness index based on a frequency of negative previous results calculated based on the total number of negative previous results, and wherein selecting the subset of the test cases comprises at least one of:
 selecting a test case, from the plurality of test cases, to be part of the subset of test cases, in response to a total number of negative previous results generated by previous runs of the test case, as indicated in a sequence of previous results associated with the test case, being larger than one or more other test cases in the plurality of test cases,
 selecting a test case, from the plurality of test cases, to be part of the subset of test cases, based on a number of changes in results generated by previous runs of the test case in the sequence of previous results associated with the test case, the changes in results being either a change from a negative result to a positive result or a positive result to a negative result; or
 selecting a test case, from the plurality of test cases, to be part of the subset of test cases, in response to the test case having a more recent negative previous result when compared to one or more other test cases in the plurality of test cases.

9. The computer program product according to claim 8, wherein the system is a software application.

10. The computer program product according to claim 8, wherein selecting the subset of the test cases further comprises:
 updating the threshold value at each run of the regression test to reduce a number of the selected test cases with respect to a previous run of the regression test.

11. The computer program product of claim 8, wherein calculating an effectiveness index of the test case based on the previous results of the test case comprises:
 updating the initial estimate of the effectiveness index based on a variability gauge value calculated based on the number of changes in results generated by previous runs of the test case in the sequence of previous results associated with the test case, to thereby generate the effectiveness index.

12. The computer program product of claim 11, wherein the effectiveness index is calculated using the formula:

$$\eta = \eta + ((1-\eta)/2)*(2*G_v - 1)$$

where $\eta$ is the effectiveness index and $Gv$ is the variability gauge value.

13. The computer program product of claim 11, wherein calculating an effectiveness index of the test case based on the previous results of the test case comprises:
 updating the effectiveness index based on a recency value calculated based on a most recent run of the test case that resulted in a negative previous result.

14. The computer program product of claim 13, wherein the effectiveness index is updated based on the recency value using the formula:

$$\eta = \eta + ((1-\eta)/2)*(2*G_p - 1)$$

where $G_p$ is the recency value.

15. An apparatus, comprising:
 a processor; and
 a memory coupled to the processor, wherein the memory comprises instructions which, when executed by the processor, cause the processor to perform a regression test of a system following a plurality of previous runs of a test on said system, each previous run of the test including the execution of at least part of a plurality of test cases each one providing a corresponding previous result, wherein the regression test of the system comprises:
 selecting a subset of test cases, from the plurality of test cases, based on a sequence of previous results of the test cases; and
 executing the selected test cases on the system to perform regression testing of the system and generate regression test results indicative of whether or not changes to the system have introduced errors, wherein:
 each previous result is positive when indicative of a correct operation of the system or negative when indicative of an error of the system, wherein selecting the subset of test cases comprises selecting a test case, from the plurality of tests cases, to be part of the subset of test cases, and wherein selecting a test case, from the plurality of test cases, to be part of the subset of test cases comprises:
  calculating an effectiveness index of the test case based on the previous results of the test case, and
  selecting the test case to be a part of the subset of the test cases according to a comparison of the effectiveness index of the test case with a threshold value, wherein calculating an effectiveness index of the test case based on the previous results of the test case comprises calculating an initial estimate of the effectiveness index based on a frequency of negative previous results calculated based on the total number of negative previous results, and wherein selecting the subset of the test cases comprises at least one of:

selecting a test case, from the plurality of test cases, to be part of the subset of test cases, in response to a total number of negative previous results generated by previous runs of the test case, as indicated in a sequence of previous results associated with the test case, being larger than one or more other test cases in the plurality of test cases, selecting a test case, from the plurality of test cases, to be part of the subset of test cases, based on a number of changes in results generated by previous runs of the test case in the sequence of previous results associated with the test case, the changes in results being either a change from a negative result to a positive result or a positive result to a negative result; or selecting a test case, from the plurality of test cases, to be part of the subset of test cases, in response to the test case having a more recent negative previous result when compared to one or more other test cases in the plurality of test cases.

16. The apparatus according to claim 15, wherein selecting the subset of the test cases further comprises:
updating the threshold value at each run of the regression test to reduce a number of the selected test cases with respect to a previous run of the regression test.

* * * * *